Oct. 21, 1924.  
E. D. EBERLE  
1,512,750  
HAYRAKE SHIELD  
Filed July 21, 1923
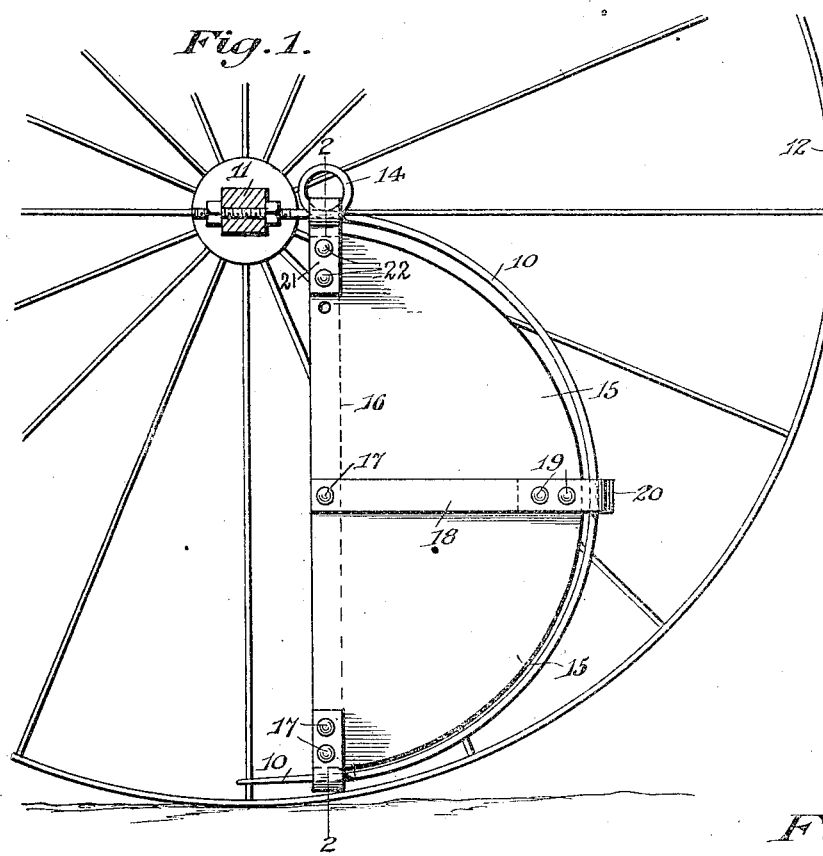
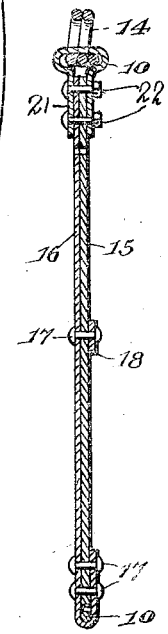
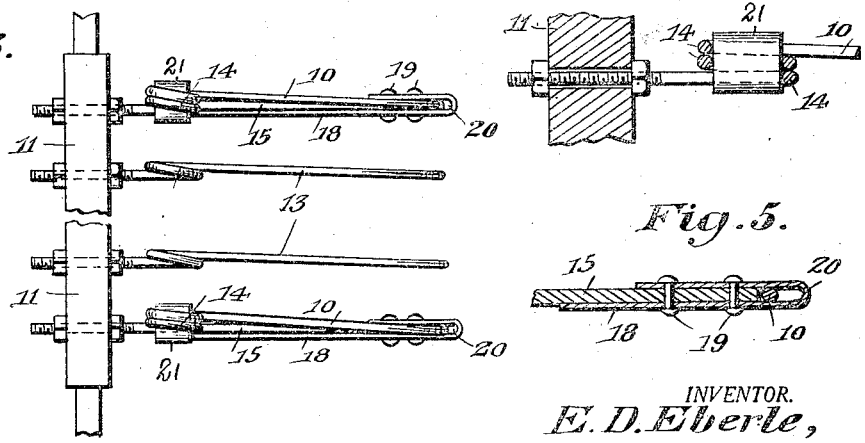
INVENTOR.  
E. D. Eberle,  
BY  
Geo. P. Kimmel, ATTORNEY.

Patented Oct. 21, 1924.

1,512,750

UNITED STATES PATENT OFFICE.

ELMER D. EBERLE, OF SUMNER, NEBRASKA.

HAYRAKE SHIELD.

Application filed July 21, 1923. Serial No. 653,012.

*To all whom it may concern:*

Be it known that I, ELMER D. EBERLE, a citizen of the United States, residing at Sumner, in the county of Dawson and State of Nebraska, have invented certain new and useful Improvements in Hayrake Shields, of which the following is a specification.

This invention relates to hay rake attachments, and has for one of its objects to provide a simply constructed attachment whereby the load of the rake will be prevented from being ejected laterally from the terminal fork members.

Another object of the invention is to provide a device of this character which may be adapted without material structural change to the various makes of rakes which are adapted to be either manually or automatically dumped.

With these and other objects in view the invention consists in certain novel features of construction as hereinafter shown and described and then specifically pointed out in the claim, and in the drawings illustrative of the preferred embodiment of the invention:—

Figure 1 is a transverse sectional elevation of a portion of a conventional rake, with the improved attachment applied.

Figure 2 is a section on the line 2—2 of Figure 1.

Figure 3 is a plan view of parts of the structure shown in Figure 1.

Figures 4 and 5 are enlarged sectional details illustrating the construction of the couplings between the guard member and the terminal rake teeth.

The improved device is shown applied to the terminal curved teeth 10 of a conventional hay rake structure, the teeth being secured in a head member 11 which is also the axle upon which the carrier wheels are journalled, a part of one of the wheels being represented at 12.

While the improved device is shown applied to a portion of a conventional rake head, it will be understood that the improved device may be applied to any of the various constructions of rakes, either manually or automatically dumped, and it is not desired to limit the invention to any specific form of raking implement.

In Figure 3 two of the intermediate teeth are shown at 13, but these are not pertinent to the present invention.

Each of the teeth is formed into a coil 14 adjacent to the head 11 to increase the resiliency, in the ordinary manner.

The improved attachment comprises a substantially semi-circular plate 15 of sheet metal or other suitable material, with its curved edge conforming substantially to the curvature of the tooth 10, but slightly smaller, and adapted to fit within the area defined by the terminal teeth and in alinement therewith, as shown in Figure 2.

The straight side edge of the plate 15 is reinforced by a stay strip 16 riveted or otherwise fastened to the plate, as at 17, and of greater length at the lower end than the plate and the surplus length bent respectively over the teeth near their free ends and secured by some of the rivets 17. The loop of the member 16 is large enough to permit a certain degree of play to the teeth. By this means the plate is loosely coupled at its lower end to the terminal teeth.

Bearing over each of the plates 15 and the reinforcing strip 16, at the upper end, is a U-shaped plate 21 which is passed through the coils 14 with its side portions bolted as at 22 to the plate 15 and its reinforcing member 16, the members 15 and 16 having a plurality of spaced apertures to enable the members 21 to be adjusted relative to the plate 15, so that the latter can be adapted to rake teeth of different sizes.

The portion of the member 21 where it engages the coil 14 is elongated as shown in Figure 2, to permit a certain degree of play between the coil and the guard plate, and the member 21 must be of sufficient strength to withstand the strains to which it will be subjected when in use.

The plate 15 is also reinforced by a transverse intermediate metal strip 18 secured at one end by one of the rivets 17, and extended at the other end and passed around the terminal tooth 10 intermediate its ends and bent over the opposite face of the plate and secured by one or more fasteners 19, as shown.

The extended portion of the strip 18 where it passes around the tooth is elongated, as shown at 20 in Figure 5, to provide space for the requisite "play" of the tooth, to prevent breakage under abnormal strains.

By this simple device a simply constructed guard attachment is produced which may be quickly coupled to the terminal teeth of the rake and by means of which the hay while being gathered is effectually prevented from being forced from the ends of the rake and against the carrier wheels or other parts.

The improved device is simple in construction, may be quickly transferred from one rake to another, and operates effectually for the purpose described.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

A device of the class described comprising a guard plate with one edge conforming substantially to the terminal tooth of a hay rake, a reinforcing member attached to the plate and extended at one end and the extended portion bent into a loop and adapted to engage the tooth near the point thereof, another reinforcing member attached to the plate at right angles to the first mentioned reinforcing member and extended at one end and bent into a loop to loosely engage the tooth intermediate the ends thereof, and a U-shaped member engaging through the spring coil of the tooth and adjustably coupled to the plate.

In testimony whereof, I affix my signature hereto.

ELMER D. EBERLE.